United States Patent [19]

Fukada et al.

[11] Patent Number: 5,268,752

[45] Date of Patent: Dec. 7, 1993

[54] IMAGE SENSING DEVICE UTILIZING SYNCHRONIZED LEDS AND LIGHT SENSORS

[75] Inventors: Takeshi Fukada, Ebina; Masaaki Hiroki, Isehara; Shunpei Yamazaki, Tokyo, all of Japan

[73] Assignee: Semiconductor Energy Laboratory Co., Ltd., Kanagawa, Japan

[21] Appl. No.: 921,959

[22] Filed: Jul. 31, 1992

Related U.S. Application Data

[63] Continuation of Ser. No. 535,154, Jun. 8, 1990, abandoned.

[30] Foreign Application Priority Data

Jun. 12, 1989 [JP] Japan .................................. 1-14978

[51] Int. Cl.$^5$ .................................................. H04N 1/46
[52] U.S. Cl. .................................. 358/500; 358/475; 358/482
[58] Field of Search ................ 358/75, 80, 483, 482, 358/41, 55, 475, 474; 355/37; 382/67

[56] References Cited

U.S. PATENT DOCUMENTS

| | | | |
|---|---|---|---|
| 4,394,089 | 7/1983 | McIntosh et al. | 358/75 |
| 4,415,925 | 11/1983 | Tamura | 358/75 |
| 4,517,591 | 5/1985 | Nagashima et al. | 358/75 |
| 4,638,372 | 1/1987 | Leng et al. | 358/75 |
| 4,660,095 | 4/1987 | Cannella et al. | 358/75 |
| 4,731,661 | 3/1988 | Nagano | 358/75 |
| 4,833,533 | 5/1989 | Augusti et al. | 358/75 |

Primary Examiner—Edward L. Coles, Sr.
Assistant Examiner—Jill Jackson
Attorney, Agent, or Firm—Sixbey, Friedman, Leedom & Ferguson

[57] ABSTRACT

A red light is emitted from a red light source and a manuscript is radiated with the emitted red light and the red light reflected from the manuscript enters image sensors arranged in parallel. The red light source is synchronized with a first switching means of a first image sensor to output an output electric signal from the first image sensor. A green light is emitted, radiated reflected, and enters in the same manner as the red light. A green light source is synchronized with the first switching means to output another output electric signal from the first image sensor. A blue light is emitted and other output electric signal is outputted in the same manner as the green light. In this way a color image of the manuscript is converted into the three electric signals with respect to a first dot of the manuscript. With respect to a second dot to a 1728th dot (in the case of an A4 size manuscript), a color image of the manuscript is also converted into the three electric signals. In this way a first line of the manuscript is scanned by the device of the present invention.

14 Claims, 7 Drawing Sheets

FIG. 7

IMAGE SENSING DEVICE UTILIZING SYNCHRONIZED LEDS AND LIGHT SENSORS

This application is a continuation of Ser. No. 07/535,154, filed Jun. 8, 1990, now abandoned.

BACKGROUND OF THE INVENTION

1. Field of the Invention

The present invention relates to an image sensor device or photosensor device used with a facsimile machine, copying machine, or image scanner and the like.

2. Description of the Prior Art

Used for conventionally known read-out systems in color read-out devices such as contact type image sensors is a device whereby a white light is shone onto a manuscript and the reflected light from the manuscript passes through a color filter provided in front of a sensor and enters the sensor, and a device using a light source which emits light in a plurality of differing wave lengths, in which the light rays of different wave lengths are successively directed onto the manuscript and color data is formulated from the light reflected from the manuscript.

In conventional devices of this type, the manufacturing process for the color filter used with the sensor incurs a high cost because the provision of the color filter itself is complicated. In addition, as the resolution of the sensor has been increased from 4 dots/mm to 8 dots/mm to 16 dots/mm, the sensor itself has been reduced in size. Accompanying this trend, the size of the color filter has been reduced, so that the higher technological level of the manufacturing process for the color filter has necessitated a higher cost.

Also, problem areas have developed with the method whereby light is emitted in a plurality of successive, differing wave lengths, inasmuch as the read-out device has increased in size and the time necessary for read out has lengthened.

Specifically, in a conventional method for reading the electrical signal for the sensor, the electric signal from a photoelectric converter section is stored in a charge storage means, and this stored charge is read out in succession as an output data.

In order that color is read out in a sensor having a formation of n dots, a red light source is first directed onto the manuscript to read out the stored electric charges in succession beginning with the first dot through the reflected light. When the read out of the n dots is completed, with the red light source, the electric charge stored in the first dot is reset, light from a green light source is emitted, and the stored charge of the first dot is read out within a set time period. Then, the second dot is reset and the stored charge of the second dot is read out within a set time period. This action is repeated n times, then light from a blue light source is emitted, and once again the same action is repeated to complete the read-out of one line.

In the process mentioned above, time is required for 3 n repetitions, so that the time used for read-out becomes extremely long.

SUMMARY OF THE INVENTION

An object of the present invention is to provide, with due consideration to the drawbacks of such conventional devices, a color image sensor device with a simple configuration.

BRIEF DESCRIPTION OF THE DRAWINGS

These and other objects, features, and advantages of the present invention will become more apparent from the following description of the preferred embodiments taken in conjunction with the accompanying drawings, in which.

DETAILED DESCRIPTION OF THE PREFERRED EMBODIMENTS

Embodiment No. 1

Figure 1:
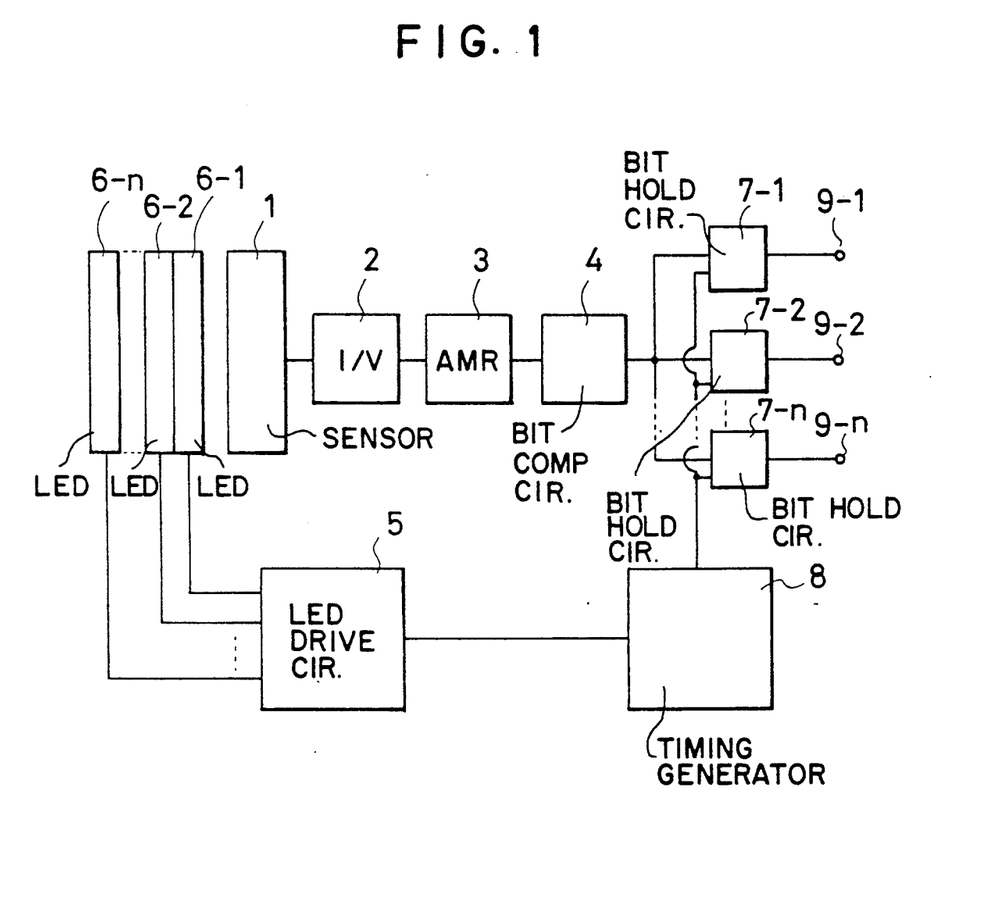
FIG. 1 is a system diagram of an image sensor device of the present invention.
Figure 2A:
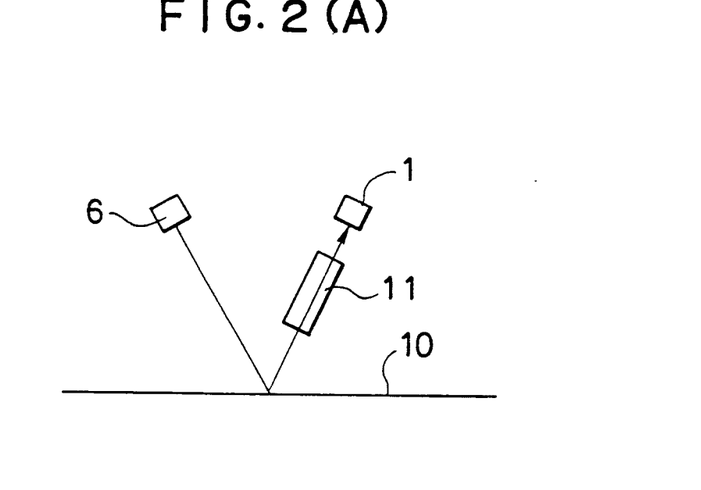
FIGS. 2A and 2B are simplified diagrams outlining an optical path through which the light emitted from a light source enters an image sensor, either through a focusing lens, or directly.
Figure 2B:
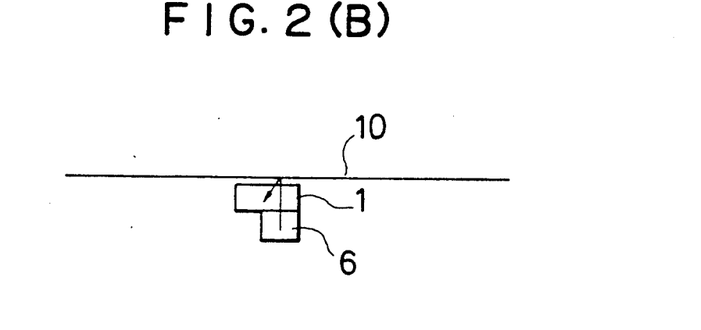

FIG. 1 is a system diagram for this embodiment. A plurality of LEDs, LED1 to LEDn (6-1 to 6-n in FIG. 1) emit lights of different wave lengths and are driven by a light source drive circuit 5. A surface having an image, for example a manuscript, a drawing, a figure, and the like, was radiated with the light emitted from the LEDs in the form of a line. The light was reflected by the surface having an image, for example by a manuscript, a drawing, a figure, and the like. (This surface having an image is referred to as image surface hereinafter.) The reflected light was shone onto a light receiving surface of a sensor 1 in the case of a normal contact-type image sensor. For example, the reflected light passes through a small self-focusing optical lens 11 and enters a sensor 1 in the case of a contact-type sensor, as shown in FIG. 2(A). For example, in the case of a complete contact-type image sensor the reflected light enters the sensor 1 without passing through a lens, as shown in FIG. 2(B).

Figure 3:
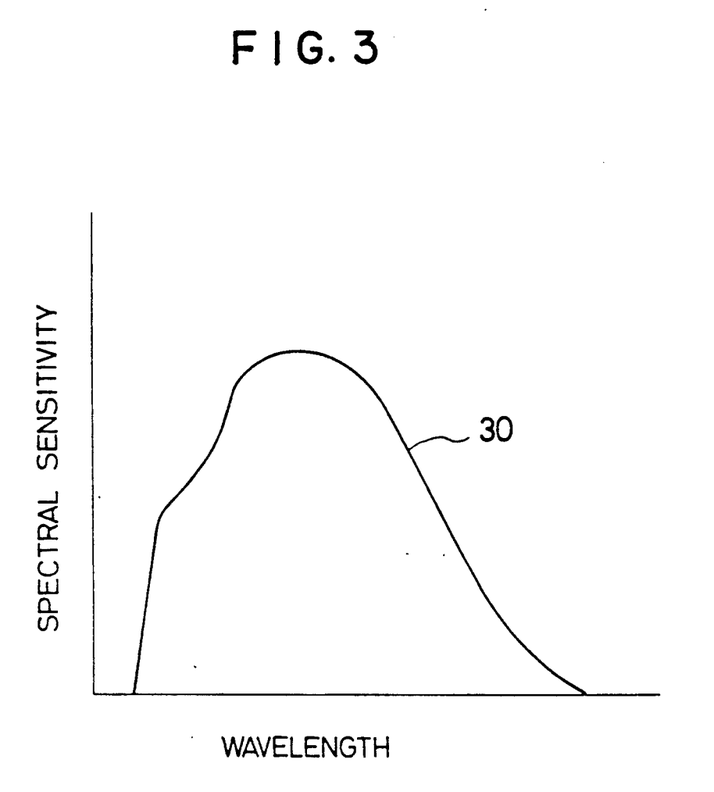
FIG. 3 is a graph showing an example of the spectral sensitivity characteristics of the material of the sensor.

FIG. 3 shows an example of the spectral sensitivity 30 of an image sensor and in this connection the spectral sensitivity differs according to the type of image sensor. An output current of the image sensor is obtained according to the wave length of the light emitted from the LED and the intensity of the light.

In the system shown in FIG. 1, the output current is also obtained according to the wavelength and the intensity of the light and this output current is read out by a read-out means without storing a charge of the output current in the charge storage means. The method in which the output current is read out without doing so is referred to as direct read-out method hereinafter. It takes less time to output the output current from the image sensor because the output current is read out without doing so.

This output current next passes through an I/V converter 2 and is converted to voltage. The converted voltage is amplified to an optional magnitude in an amplifier 3. However, the amplifier can be omitted depending on the system. The amplified signal is compensated in a bit compensator circuit 4, according to the spectral sensitivity of the sensor and the intensity of the light generated by the LEDs. The compensated signal then passes through an n-bit sample hold circuit 7-1 to 7-n and is outputted as n-bits 9-1 to 9-n at a time.

A timing generator 8 synchronizes the sample hold circuit and the LEDs.

Figure 4:
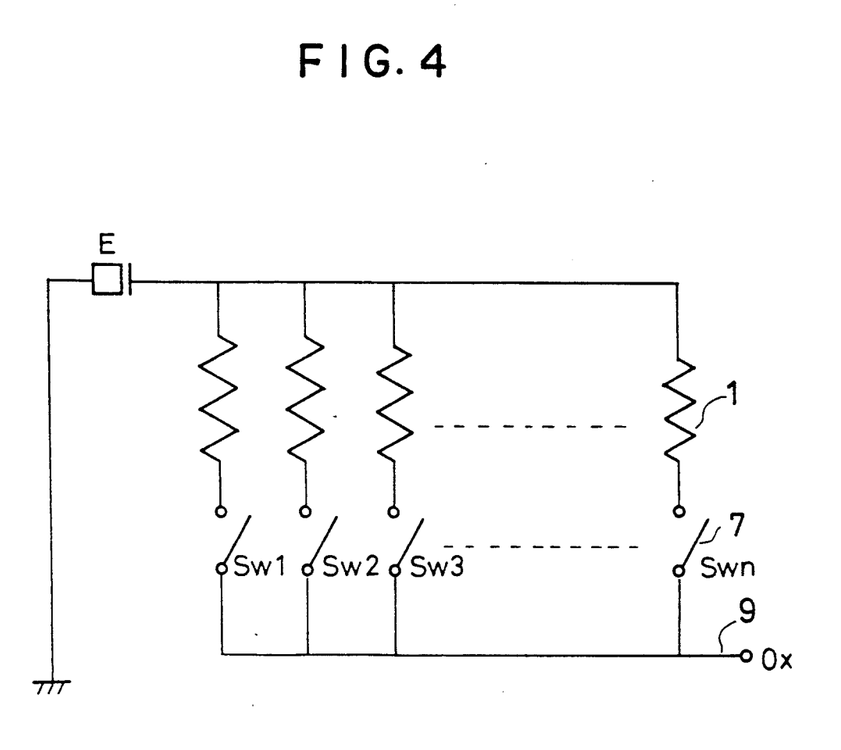
FIG. 4 is an electric circuit diagram of the present invention.

The image sensor device of the present invention can read out a color image and employs the above-mentioned direct read-out method. One example of the image sensor device employing the direct read-out method is shown in FIG. 4. In the drawing, a voltage E is applied to a plurality of sensors in parallel. Analog switches SW1 to SWn are provided adjacent to the sensors, so that current flows through the sensor only when the analog switches SW are closed, respectively. This current is directly outputted in the case of the direct read-out method. The resistance value of the sensor is a function of the intensity and the wave length of the light. Also, a current output type of sensor with a junction can be used for the image sensor device employing the direct read-out method in place of the sensor whose resistance is a function of the intensity and the wavelength although an output current of the current output type of sensor is small.

Figure 5:
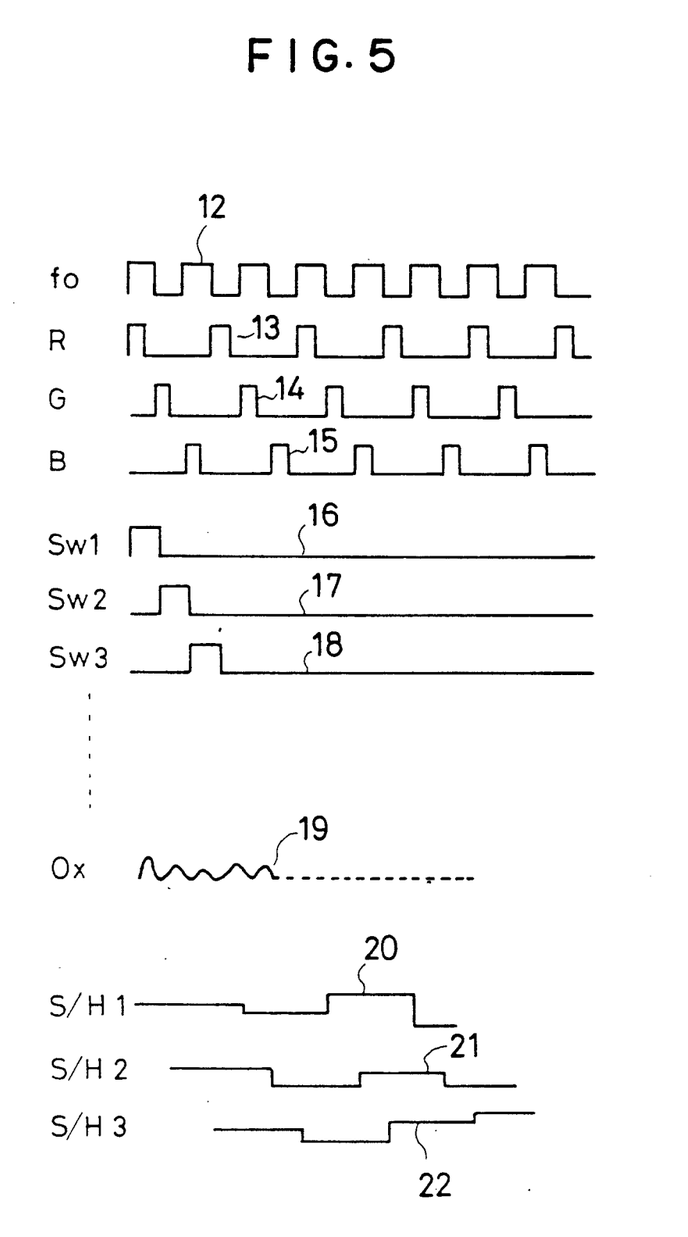
FIG. 5 is a read out timing chart for the present invention.

FIG. 5 shows a timing chart for the present invention. A basic clock signal $f_0$ 12 is provided. Based on this signal, an LED array comprising a red LED 13, a green LED 14, and a blue LED 15, as shown in FIG. 5, emits lights in succession and the switches SW1 to SWn are closed synchronized with these lights emissions and the electric signal passes through the closed switches and the bit compensator circuit 4. In this way a first line of the image surface is scanned. After scanning the first line, the signal once again passes through the closed switches and the bit compensator circuit 4 in the same manner as for the first line to thus scan a second line of the image surface. The bit compensator circuit 4 outputs a sensor output signal Ox 19, corresponding to the switches closed in succession beginning with SW1, after which successive 3-color outputs S/H1 20 to S/H3 22 are outputted through the S/H circuit.

The timing chart shown in FIG. 5 is a chart for three LEDs, but if necessary this can be easily expanded to accommodate anywhere from 2 to n LEDs.

In summary, a plurality of light sources emit lights having different wave length and direct the lights onto the image surface, and when the light reflected from the image surface is converted to current and the current is read out as data by the use of the image sensor device employing the direct read-out method, the light emission and the switching of the read-out means of the image sensor device are synchronized. And a low-cost color sensor device can be made for a color filter is not used.

Embodiment No. 2

In FIG. 4 a plurality of sensors 1 are provided. These sensors 1 are the commonly known photoconductor type of sensors of amorphous silicon. They handle an A4 size manuscript of 1728 dots at a resolution of 8 dots/mm. In the structure of this type of sensors, two opposed electrodes are positioned with a semiconductor layer interposed between them. A constant voltage is applied between the two electrodes and a current which changes according to the intensity of the light directed onto the semiconductor layer is read out directly by the direct read-out method. The output is in two gradations of black and white. The light source consists of a green and a red LED and the image sensors are connected to an I/V converter, a bit compensator circuit, 2-bit S/H circuit, a timing generator, and a light source drive circuit. Among the dots 1 to 1728, the even-numbered dots (or the odd-numbered dots) are synchronized with the red LED, and the odd-numbered dots (or the even-numbered dots) are synchronized with the green LED. After a sample hold synchronous with the red LED, the current enters one inverter so that the sensor can function as a black-red-white color sensor. The logic is as follows.

|   | 0     | 1     |
|---|-------|-------|
| 0 | WHITE | BLACK |
| 1 | WHITE | RED   |

It is also possible to make the sensor function as a 3-color sensor by using R (red), G (green), and B (blue) LEDs and altering the latter part of the logic.

Embodiment No. 3

In this embodiment a PIN-type of amorphous silicon is used as the image sensor. The PIN-type of amorphous silicon is formed by a commonly known PCVD process on a glass substrate on which a prescribed electrode pattern is formed.

In addition, three colors—red, green, and blue—light source emits a red light, a green light, and a blue light respectively. The red light, the green light, and the blue light are shone onto the image surface in succession to read the data. The rest of this embodiment is substantially the same as for Embodiment 2.

Embodiment No. 4

In this embodiment, a Thin Film Transistor (TFT) is used as the image sensor. In a conventional image sensor using a TFT, the TFT plays the role of a switch only. This has the effect of merely reducing the number of external ICs at the image sensor. However, in this embodiment the TFT has a sensor function as well as the switch function. This serves to reduce both the size and the cost of the image sensor.

Figure 6:
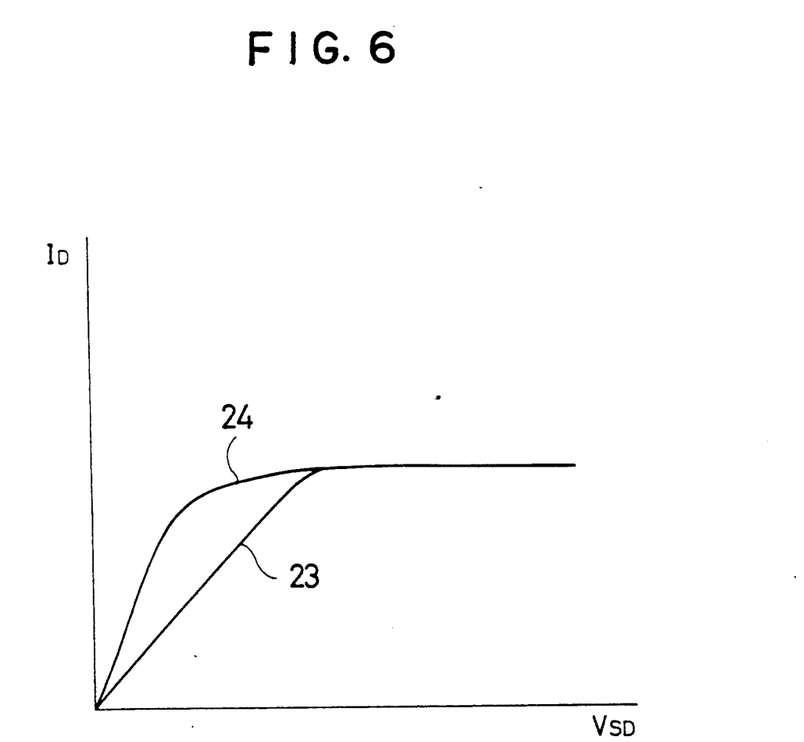
FIG. 6 is a graph showing an example of a relationship between the current and voltage characteristics of a TFT (Thin Film Transistor).

The general relationship between current and voltage between the source and drain of the TFT is in the form of a curve 23 as shown in FIG. 6. At this time a constant voltage is applied across the gate.

In the present invention, not a saturated region of the relationship but a linear region of the relationship is utilized for sensing the light reflected from the image surface and the thin film transistor (TFT) of the present invention has also the same switching function as the thin film transistor used for the conventional image sensor by turning a constant voltage applied to the gate electrode ON and OFF.

Figure 7:
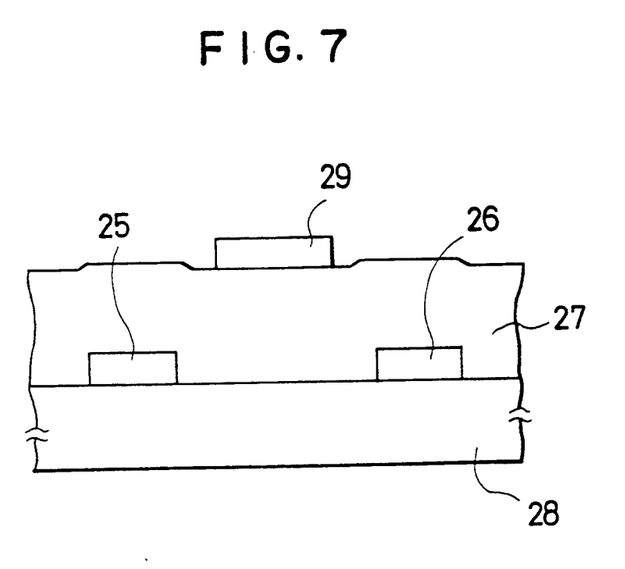
FIG. 7 is a simplified view of part of a TFT.

For example, in the case of a staggered type of TFT element such as shown in FIG. 7, a voltage is applied to the extent that the characteristics of the TFT element between a source 25 and a drain 26 are not saturated, and, at this time, if a light is not directed at a channel region 27 of the TFT, a curved relationship results, as shown by the curve 23 in FIG. 6; but when light from a substrate 28 is directed into the channel region 27, the current between the source 25 and the drain 26 increases resulting in a relationship as shown in a curve 24. Light and darkness is differentiated by the differences between these currents.

If a plurality of this type of TFT is arranged as a parallel array, the output data at a specific position in the array can be read out from the ON/OFF status of the voltage at a gate 29 of this TFT. That is, current flows through the thin film transistors(TFTs) only when the voltage is applied to the gate 29 of the thin film transistors(TFTs) and this flowing current is outputted as the output data.

In the present embodiment, this type of TFT, which has both a sensor function and a switch function, is used to read out the colors.

Light sources for three colors—red, green, and blue—are used. When applying the constant voltage to the gate electrode, the thin film transistor having the gate electrode to which the constant voltage is applied, accords with the thin film transistor from which the output data is read out. And the light sources are synchronized with the read out means comprising the thin film transistor and a means of applying the constant voltage. Accordingly, the output data is obtained in turn.

In this embodiment of the present invention the TFT plays the dual role of sensing and switching. Thus the image sensor device can be formed to be a simplified configuration, resulting in a device with reduced size and cost.

As outlined above, by fitting the device of the present invention to the exterior of a conventional line sensor which can only distinguish between black and white, it is possible to obtain two or more color signals.

By use of the present invention, without changing the essential configuration of the conventional sensor or without using a filter, a color sensor can be made, providing a low-cost color sensor device with no complex steps nor sophisticated technology necessitated.

In addition in the present invention the output current is outputted from the image sensor by the direct read-out means without storing a charge of the output current in the charge storage means. Hence, it takes less time to output the output electric signal from the image sensor.

What is claimed is:

1. In a color image sensor for reading a color document including a plurality of light sources for emitting light of respective different colors onto said document and a sensor array comprising a plurality of sensor elements for receiving light reflected by said document, the improvement comprising:

means for successively directing light of the respective colors from said plurality of light sources onto said document in a repeating sequence for each line of the document;

means for driving said sensor array for successively activating said plurality of sensor elements in synchronization with the emission of the respective different colors to directly produce a series of output signals as each line of the document is illuminated by light from the plurality of light sources; and means for reading out said series of output signals from said sensor array in synchronization with the emission of the light of the different colors on a real time basis which, for each line of the document as it is scanned, produces a readout signal which is comprised of a repeating pattern of outputs matched to the pattern of colors that are being sequentially scanned.

2. The image sensor device of claim 1 wherein said light emitting means comprises a red light source and a green light source.

3. The image sensor device of claim 1 wherein said light emitting means comprises a red light source, a green light source, and a blue light source.

4. The image sensor device of claim 1 wherein said plurality of image sensors are thin film transistors.

5. The image sensor device of claim 4 wherein gate electrodes of said thin film transistors function to turn on and off current of said plurality of image sensors in accordance with an application of a voltage to said gate electrodes from said driving means.

6. The image sensor device of claim 1 wherein said plurality of image sensors are amorphous silicon photoconductors.

7. The image sensor of claim 1 further comprising a self-focusing lens adjacent to said sensor array in order to focus the light reflected on said document onto said sensor array.

8. The image sensor of claim 1 wherein said sensor is a contact-type image sensor.

9. The image sensor of claim 1 further comprising a means for compensating said series of output signals in accordance with an intensity of the emission of the respective different colors and the spectral sensitivity of the sensor elements.

10. The image sensor of claim 1 further comprising a means for dividing said series of output signals into a plurality of signals for the respective different colors.

11. The image sensor of claim 10 further comprising an amplifier for amplifying said series of output signals.

12. The image sensor device of claim 10 wherein said means for dividing is a sample hold circuit.

13. The image sensor device of claim 1, wherein said means for reading out said series of output signals directly reads said series without the interposition of a memory storage device.

14. The image sensor device of claim 1, wherein the synchronous operation of said light directing means and said driving means occurs on a line by line basis on said document.

* * * * *